(12) United States Patent
Jeong et al.

(10) Patent No.: US 8,831,695 B2
(45) Date of Patent: Sep. 9, 2014

(54) HINGE UNIT AND PORTABLE TERMINAL USING THE SAME

(75) Inventors: Byoung-Cheon Jeong, Seoul (KR); Hyo-Sung Park, Seoul (KR)

(73) Assignee: LG Electronics Inc., Seoul (KR)

( * ) Notice: Subject to any disclaimer, the term of this patent is extended or adjusted under 35 U.S.C. 154(b) by 714 days.

(21) Appl. No.: 12/758,538

(22) Filed: Apr. 12, 2010

(65) Prior Publication Data

US 2010/0291979 A1    Nov. 18, 2010

(30) Foreign Application Priority Data

May 11, 2009    (KR) .................... 10-2009-0040934

(51) Int. Cl.
*H04M 1/00* (2006.01)
*H04M 1/02* (2006.01)
*G06F 1/16* (2006.01)

(52) U.S. Cl.
CPC ........... *G06F 1/1675* (2013.01); *H04M 1/0247* (2013.01); *H04M 1/0237* (2013.01)
USPC .................................... 455/575.4; 455/575.1

(58) Field of Classification Search
CPC ............ H04M 1/0235; H04M 1/0237; H04M 1/0247; G06F 1/1675
USPC ........................ 455/575.1, 575.4; 379/433.12
See application file for complete search history.

(56) References Cited

U.S. PATENT DOCUMENTS

| 7,463,913 | B2 * | 12/2008 | Nagashima | 455/575.4 |
| 2007/0218963 | A1 * | 9/2007 | Kim | 455/575.4 |
| 2009/0093285 | A1 * | 4/2009 | Weng et al. | 455/575.4 |
| 2009/0215506 | A1 * | 8/2009 | Kleverman | 455/575.4 |
| 2009/0232299 | A1 * | 9/2009 | Demuynck et al. | 379/433.12 |
| 2010/0099467 | A1 * | 4/2010 | Lee | 455/575.4 |
| 2010/0113110 | A1 * | 5/2010 | Lee | 455/575.4 |

* cited by examiner

*Primary Examiner* — Ping Hsieh

(74) *Attorney, Agent, or Firm* — Birch, Stewart, Kolasch & Birch, LLP

(57) ABSTRACT

A portable terminal comprises: a base; first and second bodies each connected to the base so as to perform a sliding motion; and an interworking module configured to connect the first and second bodies to each other, for sliding the second body in an opposite direction to a sliding direction of the first body by interworking the second body with sliding of the first body.

17 Claims, 11 Drawing Sheets

US 8,831,695 B2

HINGE UNIT AND PORTABLE TERMINAL USING THE SAME

CROSS-REFERENCE TO A RELATED APPLICATION

Pursuant to 35 U.S.C. §119(a), this application claims the benefit of earlier filing date and right of priority to Korean Application No. 10-2009-0040934, filed on May 11, 2009, the content of which is incorporated by reference herein in its entirety.

BACKGROUND OF THE INVENTION

1. Field of the Invention

The present invention relates to a hinge unit and a portable terminal using the same, and particularly, to a hinge unit capable of interworking a plurality of bodies with respect to one body, and a portable terminal using the same.

2. Background of the Invention

Terminals can be divided into mobile/portable terminals and stationary terminals according to their mobility. The portable terminals may be divided into handheld terminals and vehicle mount terminals according to whether a user directly carries his or her terminal.

As it becomes multifunctional, the mobile terminal can be allowed to capture still images or moving images, play music or video files, play games, receive broadcast and the like, so as to be implemented as an integrated multimedia player.

In order to support and enhance such functions of the terminal, it may be considered to improve configuration and/or software of the terminal.

SUMMARY OF THE INVENTION

Therefore, an object of the present invention is to provide a portable terminal capable of connecting bodies to one another so as to perform a relative motion in a different manner from the conventional art, and a hinge unit using the same.

Another object of the present invention is to provide a portable terminal capable of moving a second body by interworking with a first body when the first body moves with respect to a base, and a hinge unit using the same.

To achieve these and other advantages and in accordance with the purpose of the present invention, as embodied and broadly described herein, there is provided a portable terminal, comprising: a base; first and second bodies each connected to the base so as to perform a sliding motion; and an interworking module configured to connect the first and second bodies to each other, for sliding the second body in an opposite direction to a sliding direction of the first body by interworking the second body with sliding of the first body.

According to another aspect of the present invention, there is provided a portable terminal, comprising: a base; a first body having a display unit, and connected to the base so as to be movable; a second body covered by the first body in a closed configuration, having a user input unit for inputting information so as to control output to the display unit, and connected to the base so as to be movable; an interworking module configured to connect the first and second bodies to each other, for moving the second body by interworking the second body with motion of the first body; and a length controller for controlling motion lengths of the first and second bodies so that an exposed area of the user input unit with respect to the first body can be varied.

According to still another aspect of the present invention, there is provided a portable terminal, comprising: a base; first and second bodies each connected to the base so as to be slidable, and each having first and second surfaces opposite to each other; an interworking module configured to connect the second surface the of the first body to the first surface of the second body, for sliding the second body by interworking the second body with sliding of the first body; a user input unit formed on the first surface of the second body; and a power supply unit mounted to the second surface of the second body.

The first surface of the first body and the second surface of the second body may be arranged to be exposed to the outside regardless of the sliding of the first and second bodies.

According to yet still another aspect of the present invention, there is provided a portable terminal, comprising: a base; a first body coupled to the base so as to be movable along a first path, and having a display unit; and a second body coupled to the base so as to be movable along a second path, and moving along the second path by being interworked with motion of the first body along the first path.

To achieve these and other advantages and in accordance with the purpose of the present invention, as embodied and broadly described herein, there is also provided a hinge unit, comprising: a base plate having first and second rails spacing from each other; a first plate slidably connected to the first rail; a second plate slidably connected to the second rail, and configured to be covered by the first plate; and an interworking module configured to be connected to the first and second plates, for sliding the second plate so that an area of the second plate covered by the first plate can decrease when the first plate performs a sliding motion.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Figure 1:
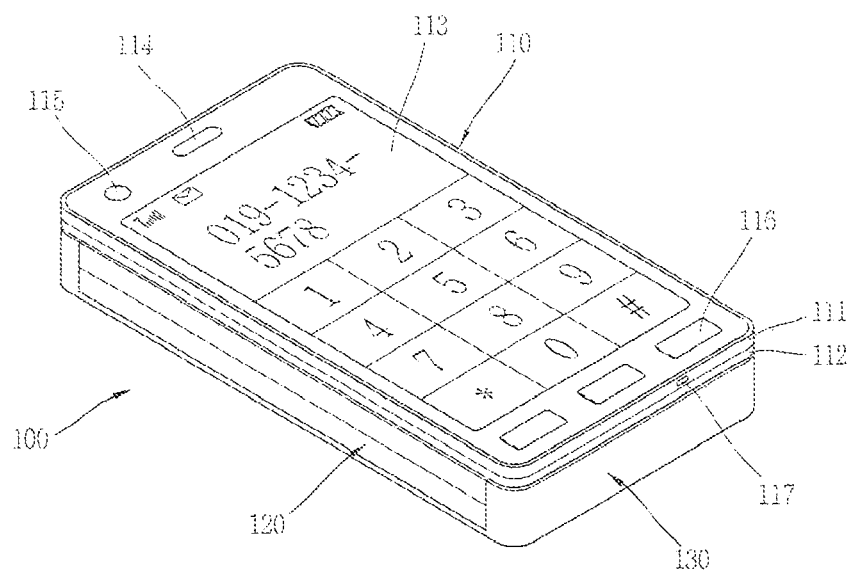
FIG. 1 is a perspective view of a portable terminal according to a first embodiment of the present invention.

Description will now be given in detail of the present invention, with reference to the accompanying drawings.

Hereinafter, a portable terminal according to the present invention will be explained in more detail with reference to the attached drawings. The suffixes attached to components of the portable terminal, such as 'module' and 'unit or portion' were used for facilitation of the detailed description of the present invention. Therefore, the suffixes do not have different meanings from each other.

The same or similar components of one embodiment as or to those of another embodiment will be provided with the same or similar reference numerals, and their detailed explanations will be omitted.

FIG. 1 is a front perspective view showing a portable terminal 100 according to a first embodiment of the present invention.

The portable terminal 100 according to the present invention comprises a first body 110, a second body 120 configured to be slidable along one or more directions of the first body 110, and a base 130 respectively connected to the first and second bodies 110, 120 so as to be slidable. The first and second bodies 110, 120 are connected to each other by interworking modules 240 (refer to FIG. 6) so that the second body 120 can be slid by being interworked with the first body 110 when the first body 110 performs a sliding motion.

Figure 3:
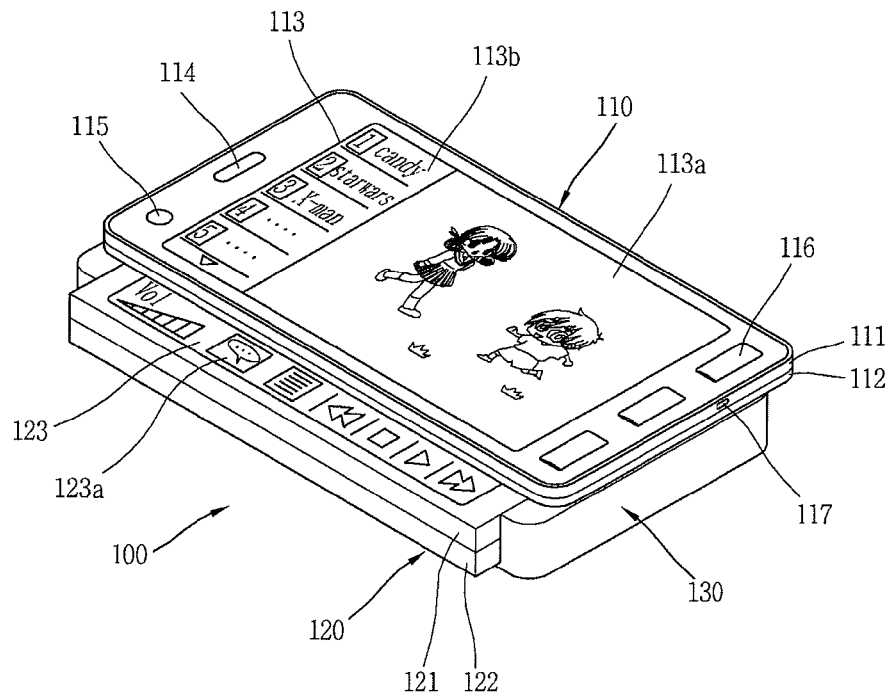
FIG. 3 is a perspective view showing a state that the portable terminal has been partially opened.
Figure 4:
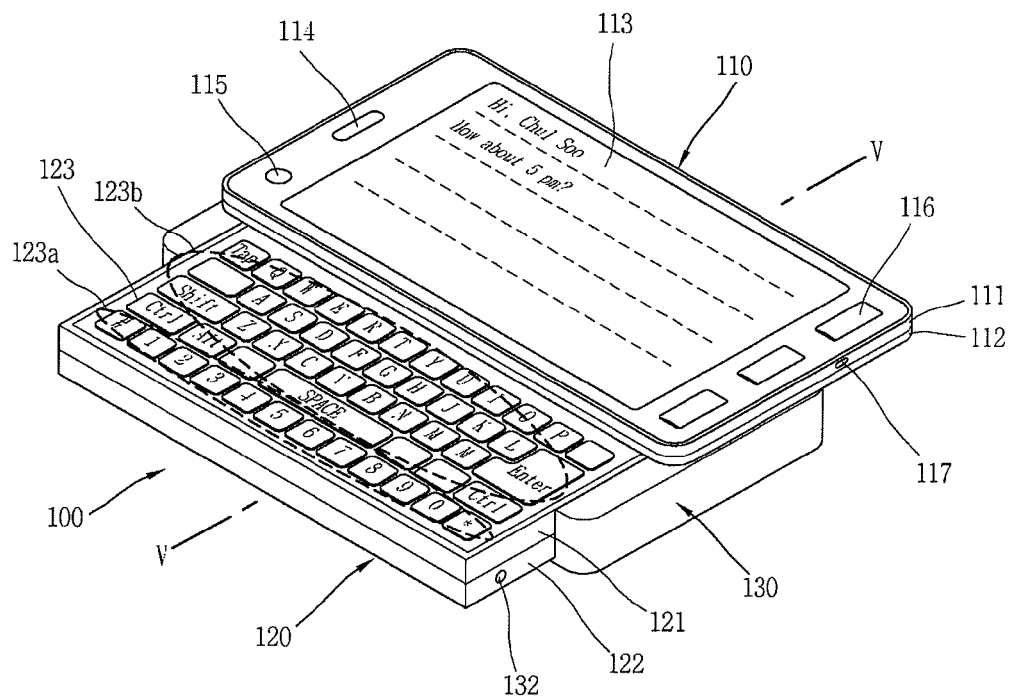
FIG. 4 is a perspective view showing a state that the portable terminal has been completely opened.
Figure 9:
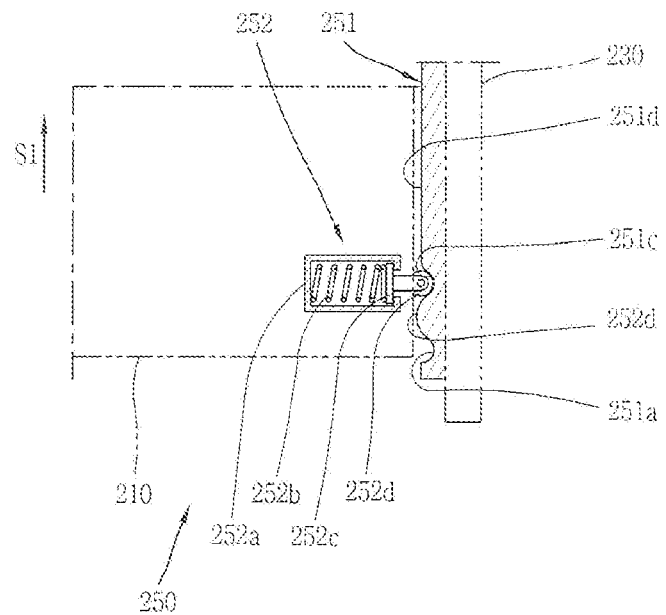
FIG. 9 is a conceptual view of a length controller.

As shown in the drawing, a state that the first body 110 completely overlaps the second body 120 may be referred to as a 'closed configuration', whereas a state that one or more parts of the second body 120 are exposed by the first body 110 may be referred to as an 'open configuration' (refer to FIGS. 3 and 4). FIG. 3 is a perspective view showing a state that the portable terminal is in a 'partially open configuration', whereas FIG. 4 is a perspective view showing a state that the portable terminal is in a completely 'open configuration'. Referring to FIG. 9, will be explained a length controller 250 for controlling the second body 120 to be in the partially or completely open configuration with respect to the first body 110. In the present invention, the motion of the first and second bodies 110, 120 with respect to the base 130 is referred to as 'sliding'. However, the present invention is not limited thereto. Rather, the present invention may be configured so that at least one of the first and second bodies 110, 120 can perform a swing or swivel operation with respect to the base 130.

Typically, the portable terminal 100 functions in a standby mode when in the closed configuration, but the standby mode may be released by a user's manipulation. Also, the portable terminal functions in a call mode, etc. when in the opened configuration. Here, the call mode, etc. may be converted into a standby mode according to a user's manipulation or time lapse.

A case forming the appearance of the first body 110 (casing, housing cover, etc.) is formed by a front case 111 and a rear case 112. Each kind of electronic components are mounted in a space formed by the front and rear cases 111, 112. If desired, one or more intermediate cases may be provided between the front and rear cases 111, 112. The cases are usually formed from a suitably ridge material such as injection molded plastic, or formed using metallic material such as stainless steel (STS) and titanium (Ti).

The front case 111 of the first body 110 may be provided with the display unit 113, and an audio output unit 114, a first video input unit 115, a first user input unit 116, and an audio input unit 117.

The display unit 113 for visually displaying information may include liquid crystal displays (LCD), organic light emitting diodes (OLED), transparent OLED (TOLED), etc.

The display unit 113 may be further provided with a touch screen for allowing information to be input by a user's touch. The display unit 113 may be formed to generate various tactile effects when being touched. This may be implemented as a haptic module that interworks with the display unit 113. A representative tactile effect generated by the haptic module includes vibration. The haptic module may be variously arranged according to configuration aspects of not only the display unit 113, but also the portable terminal 100.

The audio output unit 114 may be implemented as a receiver or a speaker. The first video input unit 115 may be implemented as a camera module to capture a user's still or moving images. The first user input unit 116 receives commands to control the operation of the portable terminal according to the first embodiment of the present invention. The audio input unit 117 may be implemented in the form of a microphone. The audio input unit 117 may be arranged to be symmetrical to the audio output unit 114 based on the display unit 113. As the user can approach to the audio output unit 114 and the audio input unit 117 through an outer surface of the first body 110, a call mode may be implemented even in a state that the portable terminal 100 is in a closed configuration. Differently from this, even when the audio input unit 117 is arranged on an outer surface of the base 130, the same result may occur. For a call connection, numeric keys that can be inputted in a touch manner may be outputted to the display unit 113.

Like the first body 110, a front case 121 and a rear case 122 may form the second body 120. A second manipulating unit 123 (refer to FIGS. 3 and 4) may be arranged on a front surface of the front case 121 of the second body 120.

A broadcast signal receiving antenna 132 may further be disposed at one side of the second body 120 in addition to an antenna for communications. The antenna 132 may be configured to be withdrawn from the second body 120.

Figure 5:
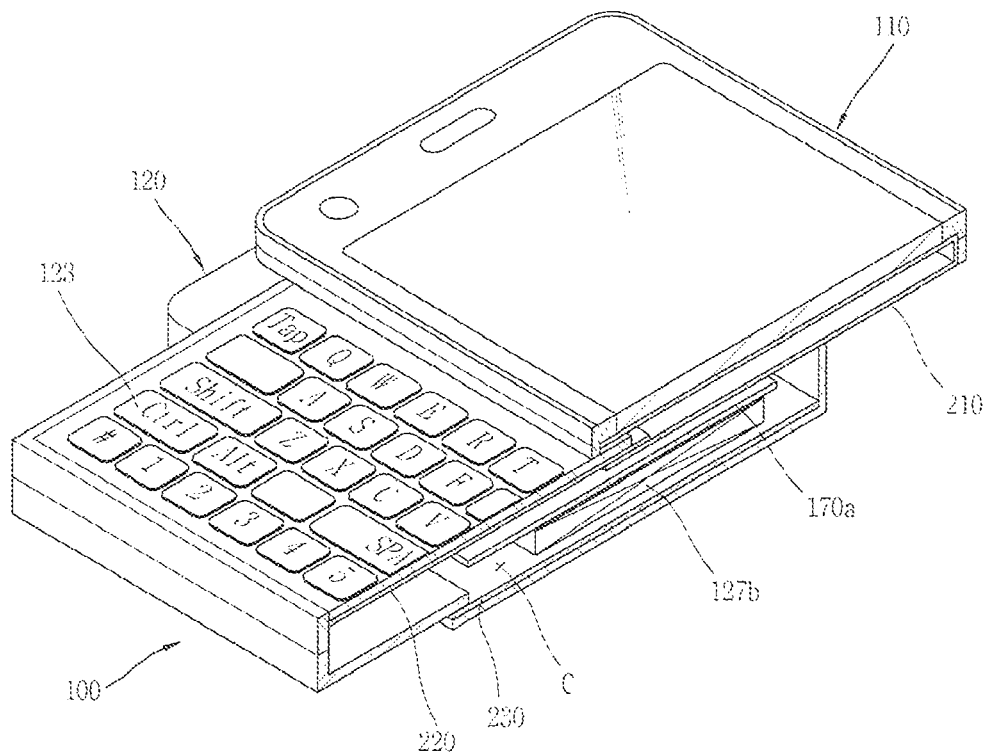
FIG. 5 is a sectional view taken along line 'V-V' in FIG. 4.

The base 130 defines a space (C) for accommodating the second body 120 together with the first body 110 (refer to FIG. 5). The space (C) is formed to have one opened side so that the second body can be inserted thereinto or withdrawn therefrom.

Figure 2:
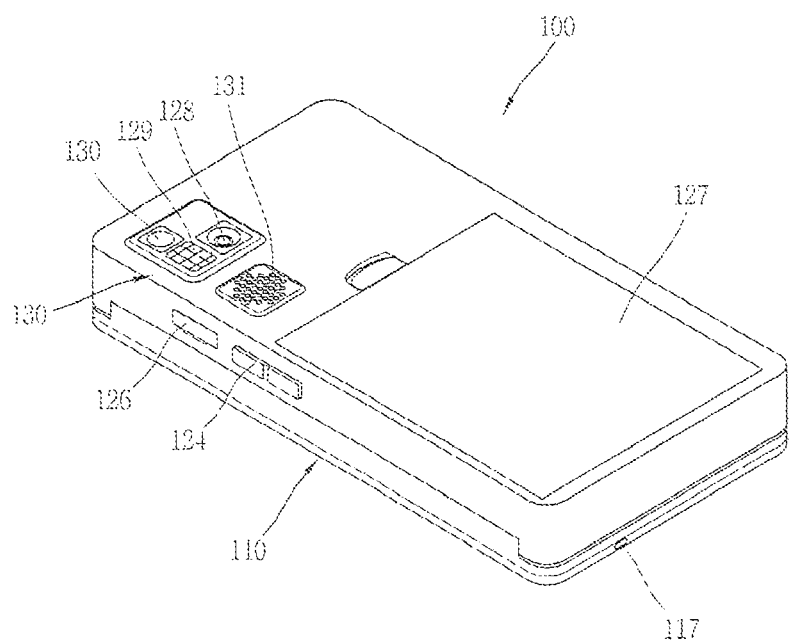
FIG. 2 is a perspective view showing a rear surface of the portable terminal of FIG. 1.

FIG. 2 is a perspective view showing a rear surface of the portable terminal 100 of FIG. 1.

Referring to FIG. 2, the base 130 defines a surface facing a main surface of the first body 110. One pair of side surfaces facing each other among side surfaces curvedly-extending from the main surface of the first body 110 are defined by the base 130 and the second body 120.

At the base 130, a third manipulating portion 124, an interface 126, etc. may be arranged.

The first to manipulating units 116, 123, 124 may be referred to as a 'user input unit', and may be implemented in any types to input information in a user's tactile manner.

For instance, the user input unit may be implemented as a dome switch or a touch screen or a touch pad to input information or commands by a user's push or touch. Also, the user input unit may be implemented as a jog wheel or a jog switch.

In the aspect of functions, the first user input unit 116 may serve to input various commands such as start, stop, and scroll commands, whereas the second user input unit 123 may serve to in put numbers, characters, symbols, or etc. And, the third manipulating portion 124 may serve as hot keys configured to perform specific functions such as activation of the first video input unit 115.

The interface 126 serves as a passage through which the portable terminal 100 of the present invention exchanges data with external devices. For instance, the interface 126 may include at least one of wired/wireless terminals to be connected to earphones, power supplies to supply power to short-range communication ports (e.g., IrDA port, Bluetooth port, and wireless LAN port). Also, the interface 126 may be implemented as a card socket (e.g., for coupling to a memory card, subscriber identity module (SIM) card, and user identity module (UIM) card).

A power supply unit 127 for supplying power to the portable terminal 100 may be mounted on the main surface of the base 130. The power supply unit 127 may be implemented as a chargeable battery, and may be detachably mounted to the portable terminal 100.

A second video input unit 128 may be further mounted on the main surface of the base 130. The second video input unit 128 may be a camera having a capturing direction which is opposite to that of the first video input unit 115 (refer to FIG. 1), and having different pixels from those of the first video input unit 115.

For example, the first video input unit 115 may operate with relatively lower pixels (lower resolution). Thus, the first video input unit 115 may be useful when a user can capture his or her face and send it to another party. On the other hand, the second video input unit 128 may operate with a relatively higher pixels (higher resolution) such that it can be useful for a user to obtain higher quality pictures for later use.

A flash 129a and a mirror 129b may be additionally disposed adjacent to the second video input unit 128. The flash 129 projects light toward an object when capturing the object by using the second video input unit 128. The mirror 130 can cooperate with the second video input unit 128 to allow a user to photograph himself or herself in a self-portrait mode.

An audio output unit 131 may be further disposed at the base 130. The audio output unit 131 can cooperate with the first audio output unit 114 (refer to FIG. 1) to provide stereo output. Also, the audio output unit 114 may be configured to operate as a speakerphone.

In the above configuration, the second video input unit 128, etc. are arranged at the base 130. However, the present invention is not limited thereto. At least one of the components 128 to 132 explained to be disposed at the rear case 122 may be mounted to the rear case 112 of the first body 110. In this case, the components arranged at the rear case 112 in a closed configuration may be protected by the second body 120 and the base 130. Furthermore, even if the second video input unit 128 is not additionally provided, the first video input unit 115 is rotatably formed to capture an image even in a capturing direction of the second video input unit 128.

FIG. 3 is a perspective view showing a state that the portable terminal has been partially opened, and FIG. 4 is a perspective view showing a state that the portable terminal has been completely opened.

Referring to FIG. 3, once the first body 110 is made to a little slide with respect to the base 130, the second body 120 is interworked with the first body 110, thereby performing a sliding motion in an opposite direction to the sliding direction of the first body 110. As a result, the second user input unit 123 arranged on the front surface of the second body 120 overlapping the first body 110 in the closed configuration, may be exposed to the outside with respect to the first body 110.

Keys 123a of the exposed second user input unit 123 may be configured to receive inputs relating to contents outputted from the display unit 113. In the case that the second user input unit 123 includes language keys (Korean consonants and vowels & English alphabets, etc.), and numeric keys, the numeric keys may be arranged to be exposed out in a partially open configuration. In this case, a user may input telephone numbers or perform a calculation in the partially open configuration. Here, the inputted numbers are outputted to the display unit 113.

When the second user input unit 123 is a touch screen, icons of function keys serving as the keys 123a may be outputted in a touch input manner. For instance, in the case of outputting a moving image to the display unit 113, the function keys may be configured to receive commands such as temporary stop, play, backward, forward, and a play list.

Referring to FIG. 4, once the first body 110 is made to be more slid, a front surface of the second body 120 is exposed to the outside to the maximum. As a result, the entire part of the second user input unit 123 is exposed to the outside.

Referring to FIG. 3, when the second user input unit 123 includes the language keys and the numeric keys, the language keys 123b are exposed to the outside as well as the numeric keys 123a. Since the numeric keys 123a and the language keys 123b serve to input different types of information, the numeric keys 123a may be referred to as 'first group keys', whereas the language keys 123b may be referred to as 'second group keys'.

When the language keys 123b are configured to input English alphabets, the language keys 123b may be arranged in a 'QWERTY' manner. In this case, the user may easily write texts, memos, e-mails, etc. in English. Even when the second user input unit 123 is implemented as a touch screen, the touch screen may be configured to input the language keys 123b and the numeric keys 123a.

Referring to FIGS. 3 and 4, when the current state of the portable terminal is converted to the 'partially open state' or the 'completely open state' from the 'closed state' while the display unit 113 outputs first contents such as moving images in the closed state, second contents different form the first contents may be outputted together with the first contents.

For instance, when the current state of the portable terminal 100 is converted into the 'partially open state', the display unit 113 may output a list representing other reproducible moving images as well as the currently playing moving images. These reproducible moving images may be scrolled or selected by the function keys 123a of the second user input unit 123, thereby being reproduced instead of moving images currently being reproduced.

Once the current state of the portable terminal 100 is converted to the 'completely open state' from the 'partially open state', the display unit 113 may output a memo box together with moving images being currently reproduced. The user may write memos relating to the currently playing moving images by using the language keys 123b and the numeric keys 123a of the second user input unit 123. When a screen for text sending instead of the memo box is outputted, text sending may be also performed while viewing moving images.

FIG. 5 is a sectional view taken along line 'V-V' in FIG. 4.

Referring to FIG. 5, a first plate 210, a second plate 220, and a base plate 230 of a hinge unit 200 (refer to FIG. 6) are coupled to the first body, the second body 120, and the base 130, respectively, so as to perform a relative sliding motion therebetween. The first plate 210, the second plate 220, and the base plate 230 may be individually coupled to the first body 110, the second body 120, and the base 130, respectively. However, the first plate 210, the second plate 220, and the base plate 230 may be integrally formed with the first body 110, the second body 120, and the base 130. Referring to FIGS. 1 to 4, it was explained that the first body 110, the second body 120, and the base 130 include the first plate 210, the second plate 220, and the base plate 230, respectively. This case may be also applied to FIG. 5. The hinge unit 200 will be explained in more detail with reference to FIG. 6.

Again referring to FIG. 5, one part of the second body 120 is inserted into the first body 110. A largest area may be inserted into the first body 110 in the closed configuration, whereas a smallest area may be inserted into the first body in the completely open configuration. In the closed configuration, a part of the first body 110 may be also inserted into the second body 120.

Once a battery cover of the power supply unit 127 is separated from the main surface of the base 130, a battery accommodation portion 127b for accommodating a battery may be partially exposed to the outside through an opening 127a of the base plate 230. Even if the battery cover is formed to be extending up to both end portions of the main surface of the base 130 in a width direction, the opening 127a and the battery accommodation portion 127b may be disposed with a biased state, at one end of the base 130 in the width direction. This is in order to obtain installation and operation spaces for the interworking modules 240. A circuit board 170a of a controller 170 (refer to FIG. 11) may be arranged on the battery accommodation portion 127b. An additional circuit board may be disposed at the first body 110, thereby being electrically connect to the circuit board 170a.

Figure 6A:
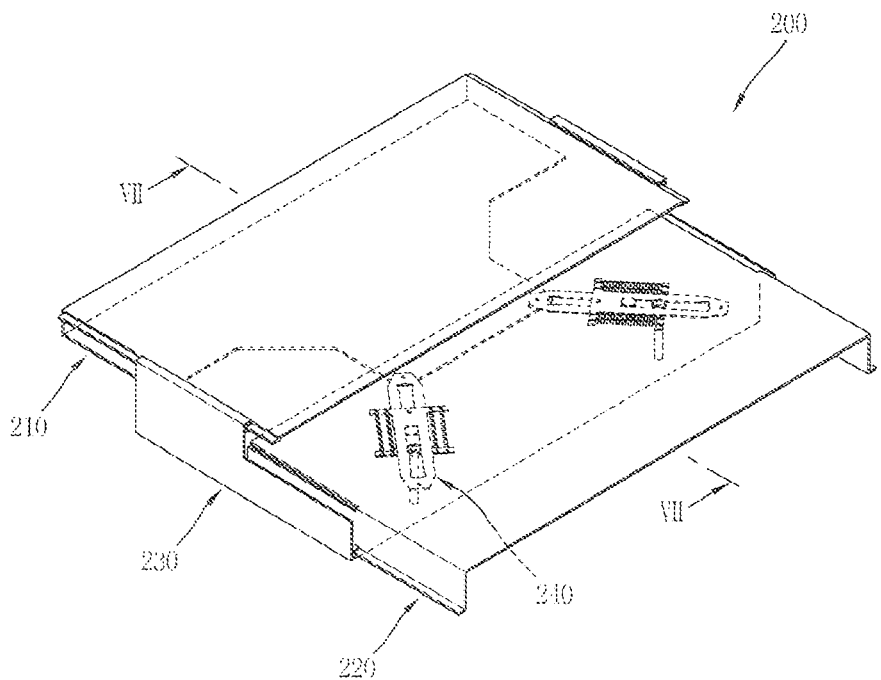
FIG. 6A is a perspective view showing a coupled state of a hinge unit of FIG. 5.
Figure 6B:
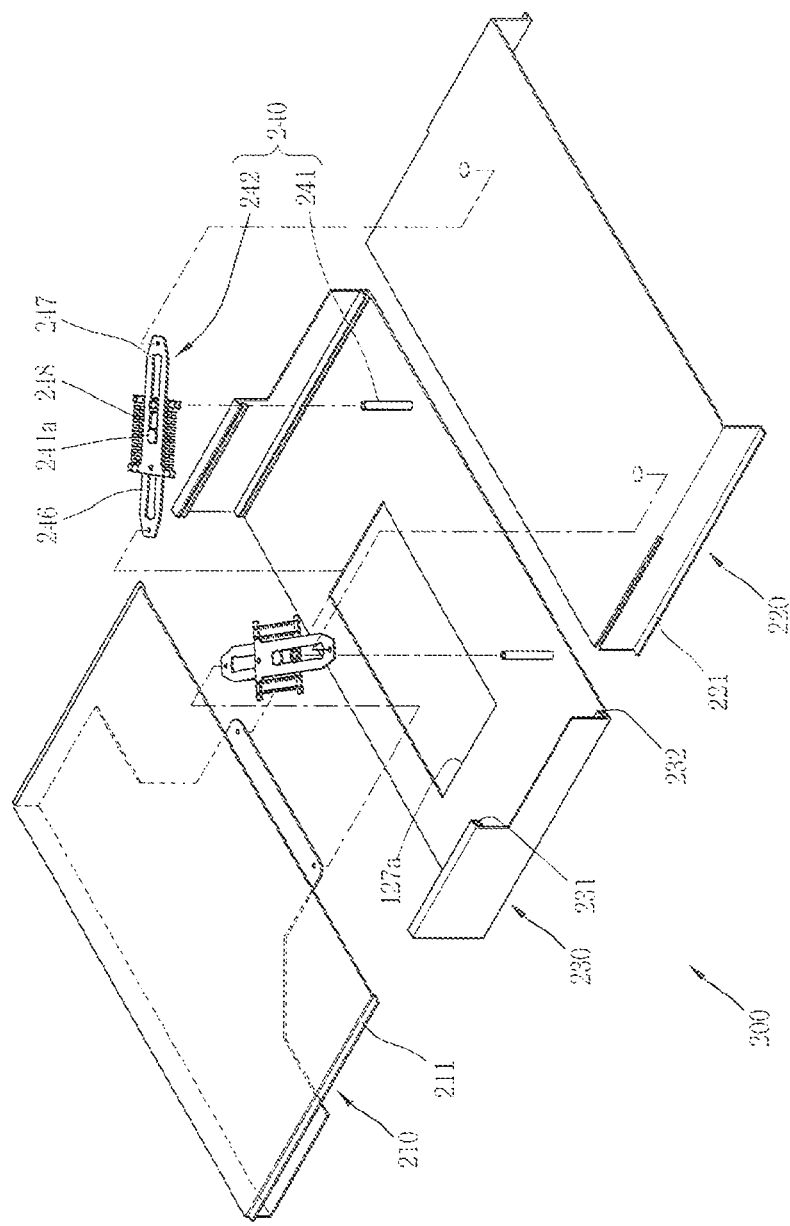
FIG. 6B is an exploded perspective view of FIG. 6A.
Figure 6C:
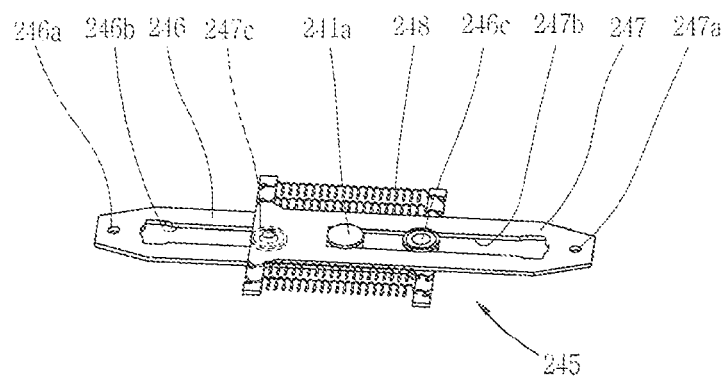
FIG. 6C is an enlarged perspective view of a rotation bar 245 of FIG. 6B.
Figure 7:
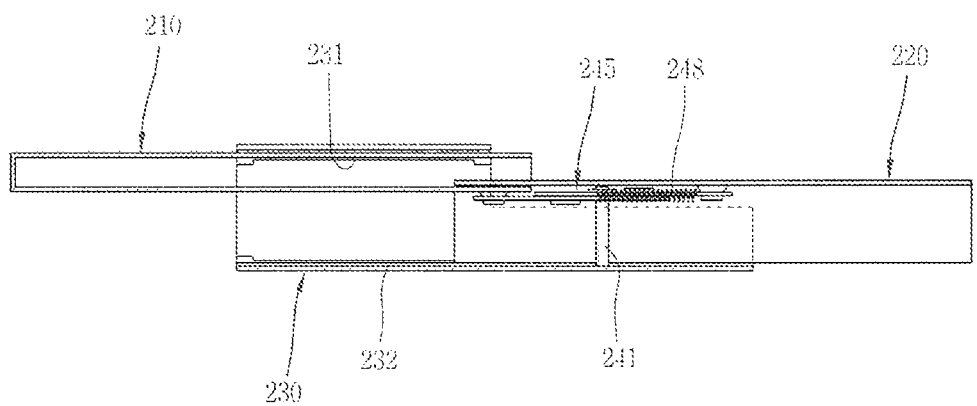
FIG. 7 is a sectional view taken along line 'VII-VII' in FIG. 6.

FIG. 6A is a perspective view showing a coupled state of the hinge unit 200 of FIG. 5, FIG. 6B is an exploded perspective view of FIG. 6A, FIG. 6C is an enlarged perspective view of a rotation bar 245 of FIG. 6B, and FIG. 7 is a sectional view taken along line in FIG. 6.

Referring to FIGS. 6A to 7, the first plate 210 is disposed to overlap the second plate 220. The base plate 230 include side surfaces disposed at both side parts of the first and second plates 210, 220, and a main surface for connecting the side surfaces to each other. The main surface of the base plate 230 is almost in parallel to main surfaces of the first and second plates 210, 220. And, the main surface of the base plate 230 is disposed at an opposite side to the main surface of the first plate 210 based on the main surface of the second plate 220.

The first plate 210 is formed so that a '□'-shaped sectional surface can be extending in a length direction, and first slide portions 211 are formed at both edges thereof. The second plate 220 is formed so that a '□'-shaped sectional surface can be extending in a direction perpendicular to the length direction, and second slide portions 221 are formed at both edges thereof. The base plate 230 is formed in a similar manner to the second plate 220. First and second rails 231, 232 are formed on both side surfaces of the base plate 230. The first slide portions 211 are slidably inserted into the first rails 231, whereas the second slide portions 221 are slidably inserted into the second rails 232.

The interworking modules 240 for interworking the first and second plates 210, 220 with each other include supporting members 241 formed at the base plate 230, and driving members 242 rotatably supported by the supporting members 241.

The supporting members 241 may be posts protruding from the main surface of the base plate 230. The driving members 242 may be implemented as rotation bars 245 for preventing the driving members 242 from being separated from the supporting members 241 by rotatably inserting central portions of the driving members 242 into free ends of the supporting members 241, and then by coupling caps 241a to the free ends of the supporting members 241. Both ends of each of the rotation bars 245 may be formed so that protrusions of the first and second plates 210, 220 can be rotatably inserted thereinto.

The rotation bars 245 are configured to be rotated centering around the supporting members 241 by the sliding of the first plate 210, thereby sliding the second plate 220 by the rotation force. In order to minimize or prevent the motion of the second plate 220 in the length direction while the rotation force is converted into a sliding force, the rotation bars 245 may include first and second links 246, 247 connected to each other so as to perform a relative sliding motion in the length direction.

Openings 246a, 247a for inserting the protrusions of the first and second plates 210, 220 are formed at the facing ends of the first and second links 246, 247. Slots 246b, 247b extending in the length direction are formed at the central parts of the openings 246a, 247a. A protrusion portion 246c formed at an end region opposite to an end region where the opening 246a of the first link 246 has been formed, is inserted into the slot 247b of the second link 247 thus to move. The first and second links 246, 247 are connected by an elastic body 248. The elastic body 248 provides an elastic force so that the first and second links 246, 247 can overlap each other by a preset area. More concretely, the elastic force of the elastic body 248 serves to restore the overlapped area between the first and second links 246, 247 to the preset area when the overlapped area is more than or less than the preset area. The elastic force may serve as a biasing force to allow the first and second plates 210, 220 to semi-automatically perform a relative motion to each other.

Figure 8A:
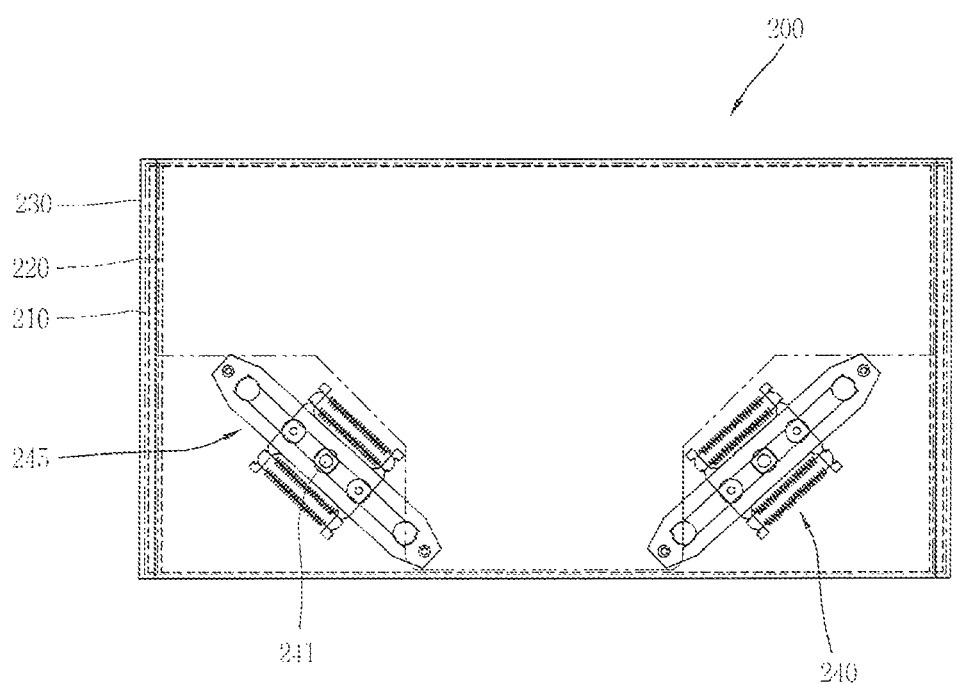
FIGS. 8A to 8C are perspective views each showing an operation state of the hinge unit when the portable terminal is in a closed configuration, a partially open configuration, and a completely open configuration.
Figure 8B:
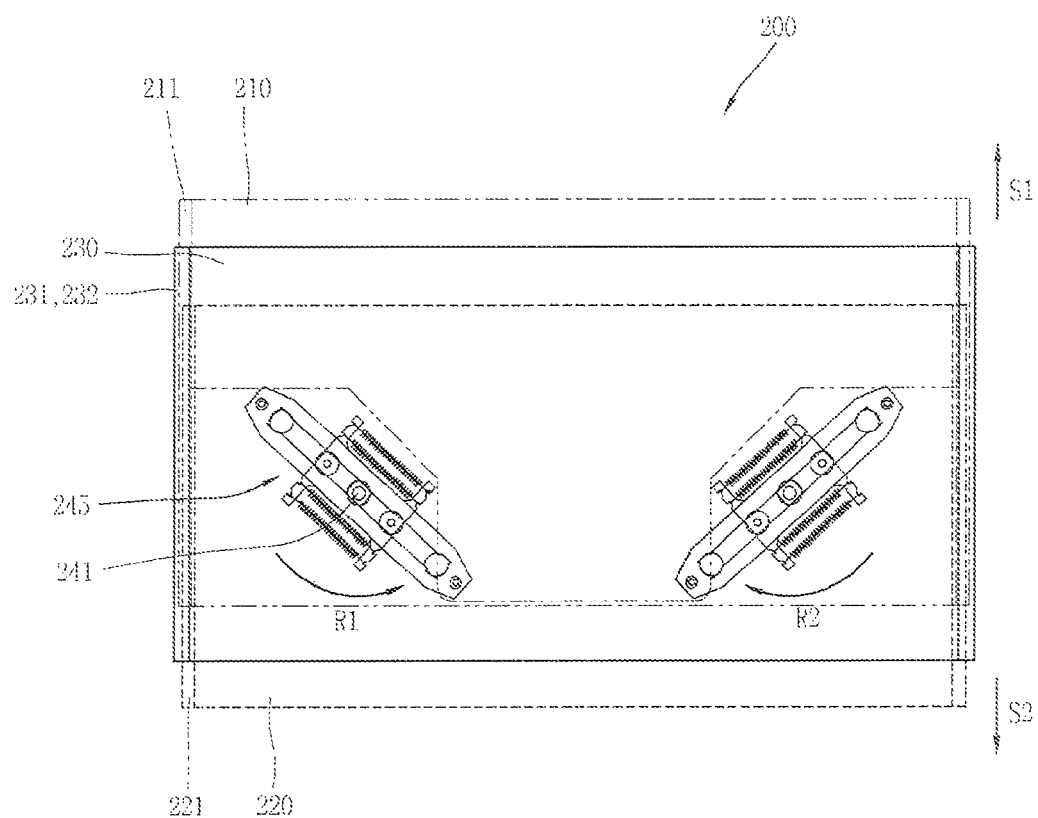
Figure 8C:
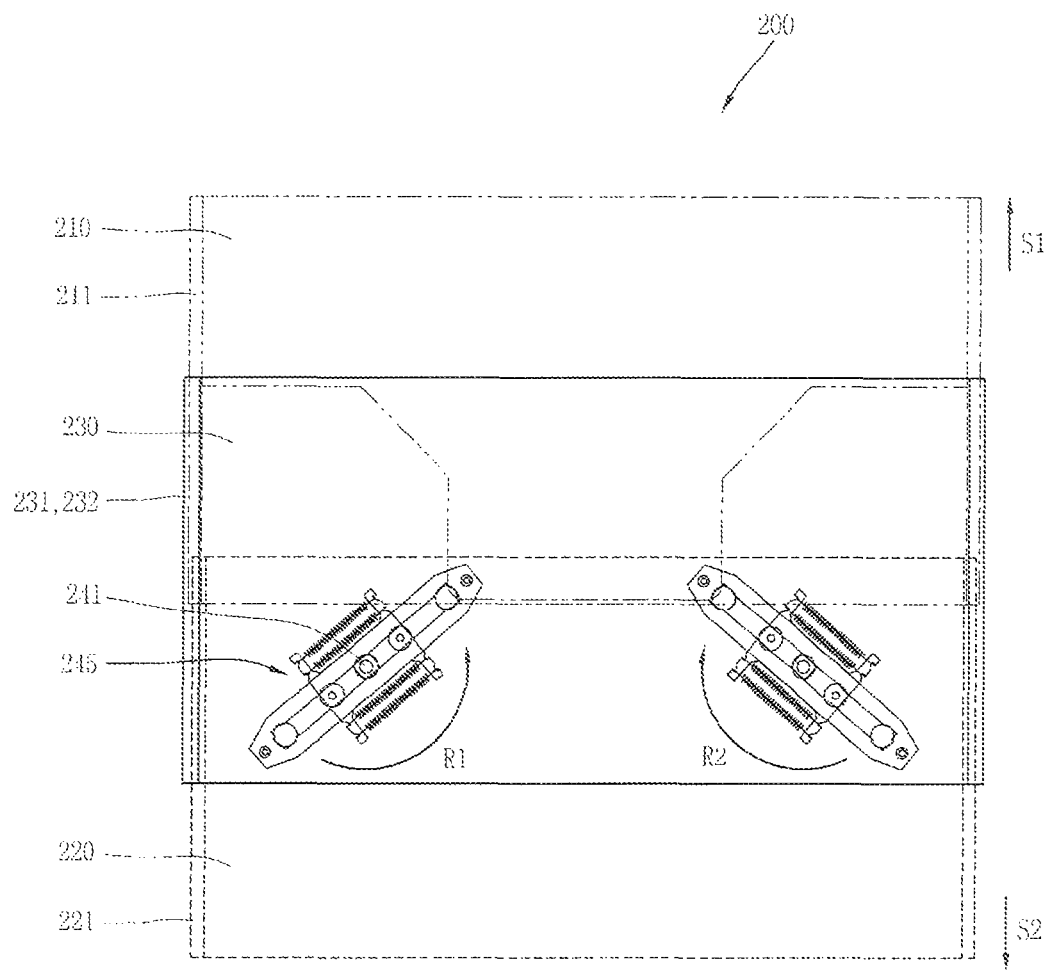

FIGS. 8A to 8C are perspective views each showing an operation state of the hinge unit 200 when the portable terminal 100 is in a closed configuration, a partially open configuration, and a completely open configuration.

Referring to FIG. 8A, in correspondence to the closed configuration of the portable terminal (refer to FIG. 1), the first plate 210, the second plate 220, and the base plate 230 are sequentially stacked to each other.

The driving members 242 of the interworking modules 240 are not rotated, but are supported by the caps 241a of the supporting members 241. The driving members 242 (rotation bars 245) may be formed in one pair, and may be disposed at both sides of the base plate 230 in the length direction.

Referring to FIG. 8B, once the first plate 210 performs a sliding motion in one direction (S1), the rotation bars 245 are rotated in opposite directions to each other (R1 and R2). These rotation forces are transmitted to the second plate 220, thereby sliding the second plate 220 in another direction (S2).

Referring to FIG. 8C, when the first plate 210 performs a maximum sliding motion with respect to the base plate 230, the rotation bars 245 are rotated in the directions (R1 and R2) by larger rotation angles. This allows the second plate 220 to slide so as to be spacing from the first plate 210 to the maximum.

When the current state of the hinge unit 200 is converted to the state of FIG. 8C from the state of FIG. 8A, the overlapped area of the second plate 220 with the first plate 210 decreases. On the contrary, when the current state of the hinge unit 200 is converted to the state of FIG. 8A from the state of FIG. 8C, the overlapped area of the second plate 220 with the first plate 210 increases.

FIG. 9 is a conceptual view of a length controller 250. As aforementioned, the length controller 250 controls a relative sliding length between the first and second bodies 110, 120 of the portable terminal 100, thereby maintaining a stopped state of the portable terminal 100 in a closed configuration, a partially open configuration, and a completely open configuration.

Referring to FIG. 9, the length controller 250 includes a cam member 251 formed at the base plate 230, and a pressurization member 252 formed at the first or second plate 210, 220.

The cam member 251 includes one or more recess portions 251a, 251c. The recess portions 251a, 251c are configured to be recessed so as to be more spacing from the pressurization member 252 than the periphery of the cam member 251. Rather than the recess portions 251a, 251c, the cam member 251 may include a planarization portion 251d, and a protrusion portion 251b more protruding toward the pressurization member 252 than the planarization portion 251d.

The pressurization member 252 includes a housing 252a having an inner space of which one side is open; and a supporting plate 252c disposed at the inner space with a supported state by an elastic body 252b, and movable so as to be spacing from or closer to the cam member 251. The supporting plate 252c may directly come in contact with the cam member 251. However, in the preferred embodiment, the supporting plate 252c is provided with a roller 252d at a free end thereof. The roller 252d serves to reduce friction when the supporting plate 252c performs a sliding contact with the cam member 251, more than the case that the supporting plate 252c performs a rolling contact with the cam member 251.

When the first plate 210 performs a relative sliding with respect to the base plate 230 in one direction (S1), the roller 252d of the pressurization member 252 moves from the first recess portion 251a to the second recess portion 251c via the protrusion portion 251b. Once the first plate 210 more slides, the roller 252d is deviated from the second recess portion 251c, thereby performing an additional motion along the planarization portion 251d.

A state that the roller 252d has been accommodated in the first recess portion 251a is shown in FIG. 8A, whereas a state that the roller 252d has been accommodated in the second recess portion 251c is shown in FIG. 8B. And, a state that the roller 252d has moved to an end region of the planarization portion 251d is shown in FIG. 8C. The roller's sliding section on the protrusion portion 251b is divided into an ascending part and a descending part. An elastic force accumulated in the elastic body 252b at the ascending part serves to allow the to roller 252d to be elastically biased toward the recess portion 251a at the descending part. While moving along the planarization portion 251d, the roller 252d is elastically biased toward the end of the planarization portion 251d by an elastic force of the elastic body 248 of FIG. 6 of each of the interworking modules 240.

Figure 10:
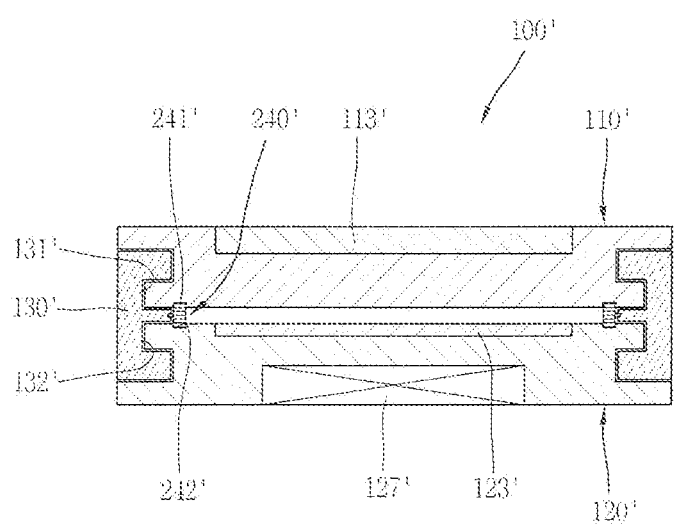
FIG. 10 is a sectional view of a portable terminal according to a second embodiment of the present invention.

FIG. 10 is a sectional view of a portable terminal 100' according to a second embodiment of the present invention.

Referring to FIG. 10, the portable terminal 100' comprises first and second bodies 110' and 120' disposed to overlap each other. The first and second bodies 110 implement one pair of facing surfaces of the portable terminal 100'. A display unit 113' may be arranged on an exposed main surface of the first body 110', whereas a power supply unit 127' may be arranged on an exposed main surface of the second body 120'. A user input unit 123' may be disposed on a front surface of the second body 120' which overlaps the first body 110' in the closed configuration.

Side surfaces curvedly-extending from main surfaces of the first and second bodies 110', 120' are defined by a base 130'. The base 130' includes first and second rails 131' and 132' along which the first and second bodies 110', 120' are slidably inserted thereinto, respectively.

An interworking module 240' for interworking the first and second bodies 110', 120' includes a first gear 241' disposed therebetween.

On each surface of the first and second bodies 110', 120', formed is a second gears 242' facing the first gears 241'. If the first gear 241' is a pinion gear, the second gear 242' may be a rack gear. The rack gear is formed to be extending along a length direction of the first and second bodies 110', 120'.

Rather than the interworking modules 240', the aforementioned interworking modules 240 may be adapted to interwork the first and second bodies 110' and 120' with each other. On the contrary, the interworking modules 240' may replace the aforementioned interworking modules 240.

Figure 11A:
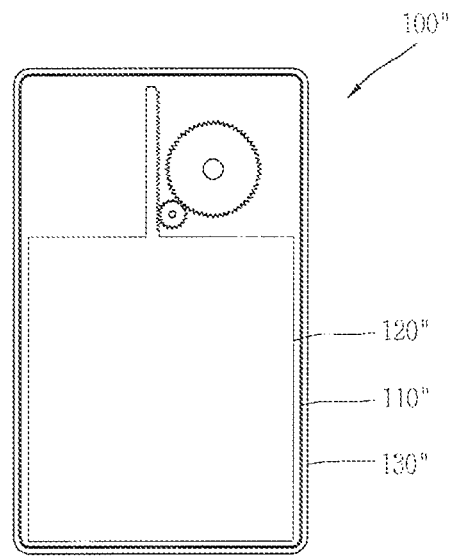
FIG. 11A is a conceptual view of a portable terminal 100" according to a third embodiment of the present invention, which shows a closed configuration.
Figure 11B:
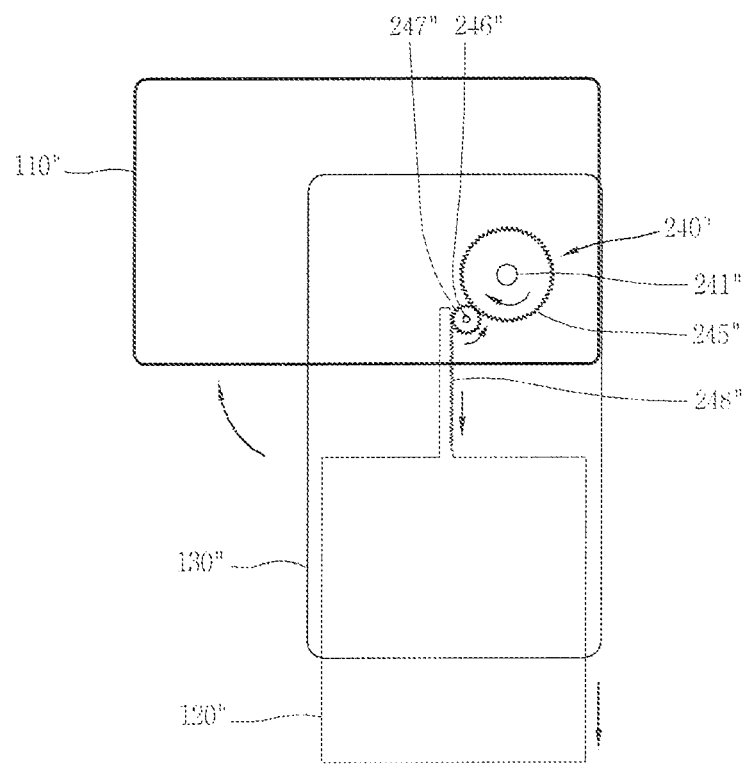
FIG. 11B is a conceptual view showing an open configuration of the portable terminal 100"

FIG. 11A is a conceptual view of a portable terminal 100" according to a is third embodiment of the present invention, which shows a closed configuration, and FIG. 11B is a conceptual view showing an open configuration of the portable terminal 100.

Referring to FIGS. 11A and 11B, a first body 110" is rotatably connected to a base 130". The first body 110" may be rotated with facing the base 130" so that another part thereof can form a circular arc around one part thereof. A second body 120" may be formed to be linearly-moveable with respect to the base 130". Once the first body 110" is provided with a display unit, the second body 120" may be provided with a user input unit. An exposed area of the user input unit to the outside may be varied according to the linear motion of the second body 120".

The linear motion of the second body 120" is interworked with the rotational motion of the first body 110" by the interworking module 240". The interworking module 240" includes a supporting member or a supporting shaft" formed at the base 130", and a first gear 245" rotatably supported by the supporting shaft 241". The first gear 245" is rotated by rotation of the first body 110". A second gear 247" is supported by a second supporting shaft 246" so as to be engaged with the first gear 245" with respect to the base 130". A rack gear 248" engaged with the second gear 247" is formed at the second body 120" so as to be disposed in a length direction of the second body 120".

Under these configurations, once the first body 110" is rotated, the first gear 245" is rotated to rotate the second gear 247" in an opposite direction to its rotation direction. As the rack gear 248" engaged with the second gear 247" is moved, the second body 120" is linearly moved.

Figure 12:
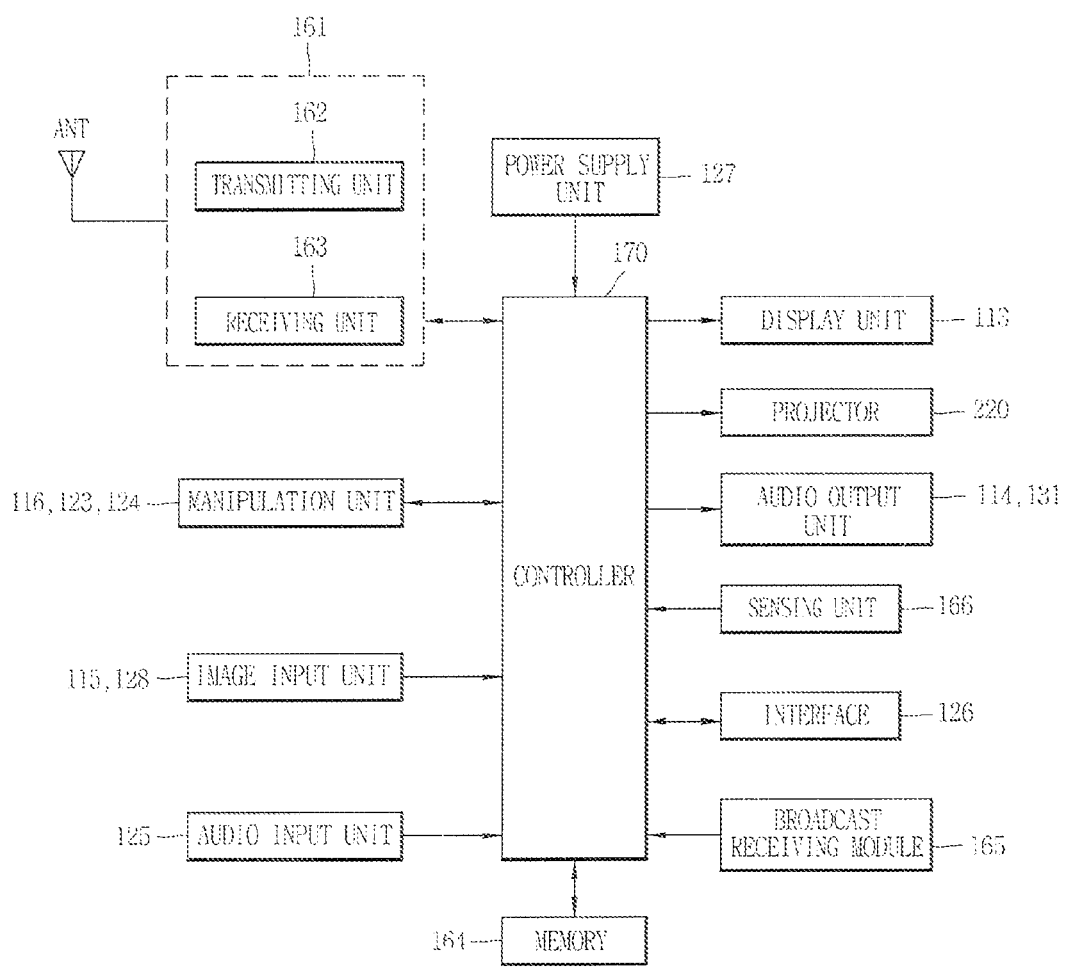
FIG. 12 is a block diagram of the portable terminal according to the present invention.

FIG. 12 is a block diagram of the portable terminal 100 according to the present invention.

Hereinafter, the portable terminal 100 according to the first embodiment of the present invention will be explained. However, the fact that the configuration of the portable terminal 100 may be also applied to the portable terminals 100', 100" according to the second and third embodiments will be obvious to those skilled in the art.

Referring to FIG. 12, the portable terminal 100 according to the first embodiment of the present invention comprises a wireless communication module 161, user input units 116, 123, 124, video input units 115, 128, an audio input unit 117, a display unit 113, audio output units 114, 131, a sensing unit 166, an output unit 150, a memory 160, an interface 126, a broadcasting signal receiving module 165, a memory 164, a power supply unit 127, and a controller 170.

The controller 170 controls an overall operation of the portable terminal 100. For instance, the controller 170 performs controls and processes relating to data communication, video call, voice call, etc. The controller 170 not only controls general functions, but also controls the operation of the portable terminal 100.

The wireless communication module 161 transmits/receives wireless signals to/from a base station through an antenna. For instance, the wireless communication module 161 transmits/receives voice data, text data, image data, and control data under control of the controller 170. The wireless communication module 161 includes a transmitting unit 162 for transmitting signals after a modulation process, and a receiving unit 163 for demodulating received signals.

The user input units 116, 123, 124 have a configuration shown in FIG. 1, and provide, to the controller 170, key input data input by a user so as to control the operation of the portable terminal 100.

Video input units 115, 128 process image frames such as still images or moving images captured by an image sensor in a video-call mode or a capturing mode. Then, the processed image frames are converted to image data that can be displayed on the display unit 113, thereby being output to the display unit 113. Image frames processed by the video input units 115, 128 are stored in the memory 164 under control of the controller 170, or are transmitted to the outside through the wireless communication module 161.

The audio input unit 117 receives an external audio signal through a microphone in a call mode, or a recording mode, or a voice recognition mode, or the like, and then processes the received signal into electric voice data. In the case of a call mode, the processed voice data is converted into data that can be transmitted to the base station through the wireless communication module 161, and then is output to the wireless communication module 161. In the case of a recording mode, the processed voice data is output so as to be stored in the memory 164.

The audio input unit 117 may include assorted noise removing algorithms to remove noise occurring while receiving the external audio signal.

The display unit 113 may output information processed in the portable terminal 100. For example, when the portable terminal 100 is operating in a phone call mode, the display unit 13 will provide a User Interface (UI) or a Graphic User Interface (GUI) which includes information associated with the call. As another example, if the portable terminal 100 is in a video call mode or a capturing mode, the display unit 113 may additionally or alternatively display captured images, or UI or GUI under control of the controller 170. In the case that the display unit 113 includes a touch screen, the display unit 113 may be used as an input device as well as an output device.

In a call signal reception mode, a communication mode or a recording mode, a voice recognition mode, a broadcasting signal reception mode, or the like, the audio output units 114, 131 convert audio data received from the wireless communication module 161, or audio data stored in the memory 164, under control of the controller 170. Then, the audio output units 114, 131 output the converted data to the outside.

The audio output units 114, 131 output audio signals relating to functions performed in the portable terminal 100, such as sound indicating a call signal reception, or sound indicating a message reception. The audio output units 114, 131 include a speaker, a receiver, a buzzer, and so on.

The sensing unit 166 senses a current status of the portable terminal 100 such as an open/close status of the portable terminal 100, a position of the portable terminal 100, or whether a user has contacted the portable terminal 100, thereby generating sensing signals to control the operation of the portable terminal 100. For instance, when the portable terminal 100 is implemented as a slide phone, the sensing unit 166 senses whether the slide phone has been opened or not, and outputs a result of the sensing thereby to control the operation of the portable terminal 100. Furthermore, the sensing unit 166 performs sensing functions relating to whether power has been supplied from the power supply 127, or whether the interface 126 has been coupled to an external device, or the like.

The interface 126 interfaces a wire/wireless headset, an external charger, a wire/wireless data port, a card socket (e.g., memory card, SIM/UIM card), or the like with any types of external devices connected to the portable terminal 100. The interface 126 transmits data or power received from external devices, to each component in the portable terminal 100, or transmits data in the portable terminal 100 to the external devices.

The memory 164 may store programs to be processed and controlled by the controller 170, or may temporarily store input/output data (e.g., phonebook, messages, still images, moving images, or the like). The memory 164 may store programs to control the operation of the portable terminal 100 according to the present invention. The memory 164 may be implemented using any type of suitable storage medium including a flash memory type, a hard disk type, a multimedia card micro type, a memory card type (e.g., SD or DX memory), Random Access Memory (RAM), Read-Only Memory (ROM), or the like.

The broadcasting signal receiving module 165 receives broadcasting signals transmitted through satellite or terrestrial wave, and then converts to broadcasting data that can be output to the audio output units 114, 131, and the display unit 113, thereby outputting the broadcasting data to the controller 170. The broadcasting signal receiving module 165 receives broadcasting-related additional data (e.g., Electric Program Guide: EPG, channel list, or the like). Broadcasting data and additional data converted by the broadcasting signal receiving module 165 may be stored in the memory 164.

The power supply 127 receives inner or outer power, and supplies the power to each component of the portable terminal 100 under control of the controller 170.

In the hinge unit for a portable terminal and the portable terminal according to the present invention, the first body (first plate) and the second body (second plate) are respectively connected so as to be moveable, and the second body is configured to move by being interworked with motion of the first body. Accordingly, even if only the first body is moved by the user, the second body can perform a relative motion with respect to the first body.

In the case that the first and second bodies are configured to overlap and to move in directions opposite to each other, in order to completely expose the second body to the outside, the first body is made to move by a half degree rather than the entire degree.

The foregoing embodiments and advantages are merely exemplary and are not to be construed as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A portable terminal, comprising:
   a base;
   a first body slidably connected to the base;
   a second body slidably connected to the base; and
   an interworking module configured to connect the first and second bodies to each other, the interworking module being configured to slide the second body in an opposite direction to a sliding direction of the first body,
   wherein the interworking module includes:
      a first supporting member and a second supporting member formed at the base; and
      a first rotation bar and a second rotation bar rotatably supported by each of the first and second supporting members, each of the first and second rotation bars having a first link and a second link, each of the first and second links being coupled to the first and second bodies, respectively, and each of the first and second links being rotatable by the sliding of the first body to cause the second body to slide,
   wherein a central portion of each of the first and second rotation bars is rotatably fixed to a corresponding supporting member, each of the first and second links is configured to be relatively movable against the central portion, each of the first and second links has a pair of end portions, and one end portion of each pair of end portions is rotatably connected to one of the first and second bodies,
   wherein the first and second links are elastically coupled by elastic bodies, and
   wherein each of the first and second links has a slot and a protrusion, the protrusion of the first link is inserted into the slot of the second link, and the protrusion of the second link is inserted into the slot of the first link.

2. The portable terminal of claim 1, wherein the first and second bodies are slidable between an open position and a closed position.

3. The portable terminal of claim 2, wherein the first body and the base are configured to define a space therebetween, the space having an opening such that the second body is received in the space when in the closed position.

4. The portable terminal of claim 2, wherein the second body is configured to be at least partially inserted into the first body when in the closed position.

5. The portable terminal of claim 2, wherein at least one of a microphone and an audio output module is exposed at the first body when in the closed position.

6. The portable terminal of claim 2, wherein the second body includes a front surface that faces the first body when the second body is in the closed position, and a user input unit is located on the front surface.

7. The portable terminal of claim 2, wherein each of the first and second bodies have first and second surfaces opposite each other, the first surface of the first body and the second surface of the second body are arranged to be exposed to an exterior of the portable terminal regardless of the sliding of the first and second bodies.

8. The portable terminal of claim 7, wherein the interworking module is configured to connect the second surface of the first body to the first surface of the second body.

9. The portable terminal of claim 7, further comprising a user input unit located at the first surface of the second body, and a power supply unit located at the second surface of the second body.

10. The portable terminal of claim 1, wherein the first and second links are configured to be elastically biased in a state that the other end portions of the pair of end portions overlap each other along a length direction of the first and second links.

11. The portable terminal of claim 1, further comprising a length controller for controlling displacement of the first and second bodies so that an exposed area of the user input unit with respect to the first body is varied between the open position and closed position.

12. The portable terminal of claim 11, wherein the user input unit includes a 'QWERTY' type of keypad or a touch screen.

13. The portable terminal of claim 11, wherein the length controller is configured to stop the first and second bodies in a partially open position between the open and closed positions.

14. The portable terminal of claim 13, wherein the user input unit includes first and second group keys composed of different keys, and
   wherein only the first group keys are exposed when the first and second bodies are in the partially open position, and both the first and second group keys are exposed in the open position.

15. The portable terminal of claim 13, further comprising a controller, the controller being configured to cause the display unit to output first contents when the portable terminal is in the closed position and to cause the display unit to output second contents along with the first contents when the portable terminal is in the partially open position or the open position.

16. The portable terminal of claim 11, wherein the length controller comprises:
   a cam member formed at the base, the cam member having at least one recessed portion; and
   a pressurization member formed at one of the first and second bodies, at least a portion of the pressurization member being received in the recessed portion when the portable terminal is in the partially open position.

17. The portable terminal according to claim 1, wherein each of the first and second supporting members is inserted through the slots of the first link and the second link of the first and second rotation bars, respectively.

* * * * *